Patented Oct. 24, 1933

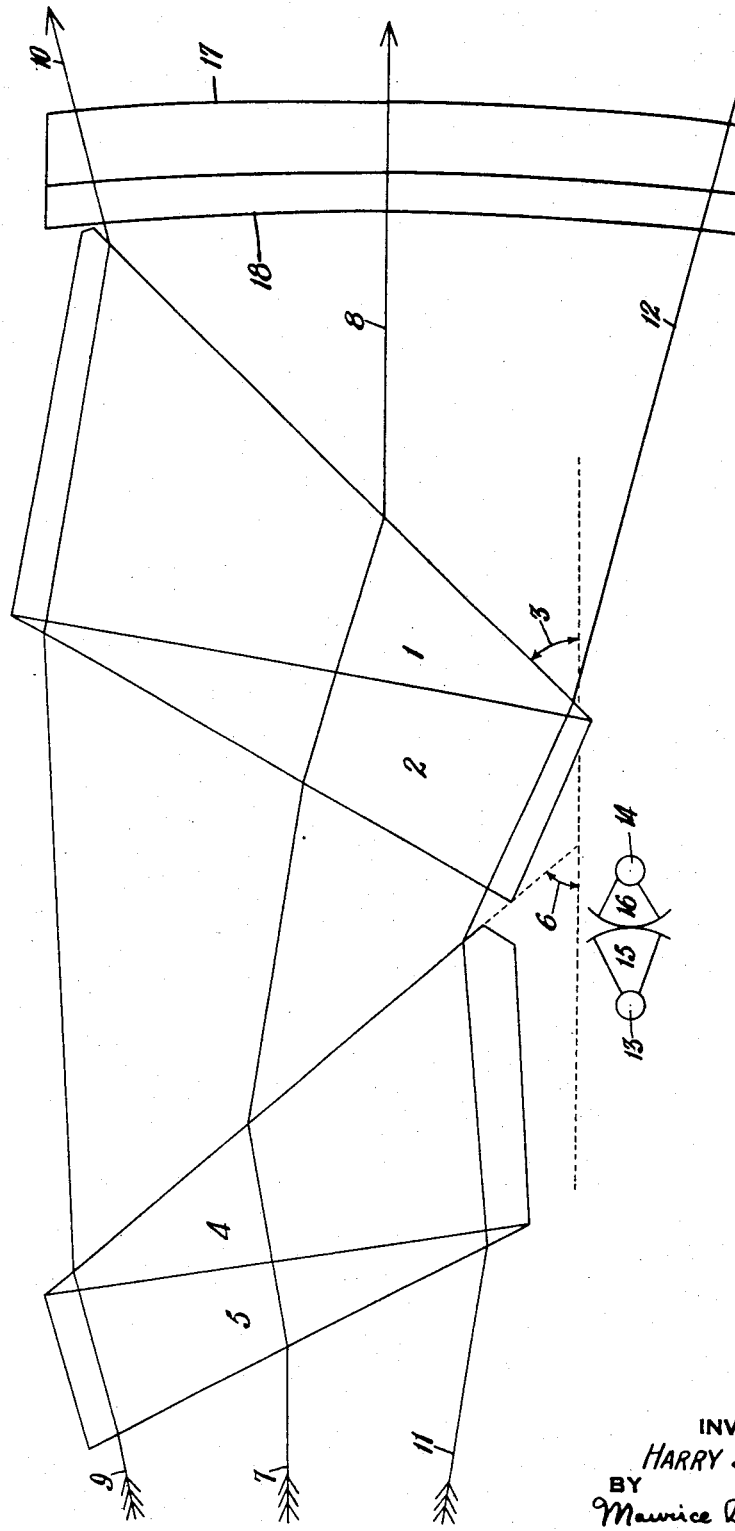

1,931,992

UNITED STATES PATENT OFFICE 1,931,992

ANAMORPHOSING PRISM OBJECTIVE

Harry Sidney Newcomer, New York, N. Y.

Application August 1, 1929. Serial No. 382,681

18 Claims. (Cl. 88—57)

This invention relates to photographic objectives and more particularly to improvements in afocal anamorphosing prism objectives for motion pictures.

Afocal anamorphosing prism objectives of this character are used in front of ordinary photographic or projection objectives and form a unidimensional compressed image of the object in the plane of the object, this image being conjugate to the image on the moving picture film formed by the ordinary objective. Anamorphosing objectives of this character consist in their simplest form of two prisms in reversed position, one perpendicular and the other at an acute angle to the axis of the objective. The general theory of such objectives has been discussed by Rudolph in the British Patent No. 8512 A. D. 1898. As is there specified, one of the simplest improvements which can be made in such an objective is to achromatize each member separately, for instance by forming each of the two prisms of appropriate angles and of glass of appropriate constringencies cemented together. There remains, however, the necessity of correcting the objective for errors of distortion.

In the drawing is shown an illustrative embodiment.

In the figure I show a longitudinal section of a prism anamorphosing objective embodying the improvements of this specification.

At 1 and 2 there are indicated respectively the high and low constringence members of an achromatized prism making an angle, 3, with the axis of the objective and at 4 and 5, the high and low constringence members of an achromatized prism making an angle, 6, with the axis of the objective, the latter angle and the strength of the prism being such as to result in no deviation to an axial pencil passing through the objective. For brevity we will call a prism anamorphosing objective of this character in which axial pencils are not deviated a "straight vision anamorphosing prism objective."

At 7, 8 there is indicated the path of an axial pencil and at 9, 10 and 11, 12 the paths of the two pencils inclined at an angle of ten degrees, respectively to the one side and the other of the axis at the end 9, 11 of the objective. The two prisms are mounted each on an axis whose ends are shown at 13 and 14. The angles of inclination of the prisms to the axis are maintained in a specified relation to each other by linking the two axes together by means of two toothed quadrants 15 and 16. At 17 and 18 are indicated the two elements of an achromatized cemented spherical doublet.

The amount of compression of the image of the object produced by such objectives increases with a decrease in the angle, 3, which the front face of the prism 1, 2 makes with the axis, and it also increases with an increase in the strength of the prism. The magnitude of these two quantities having been determined upon then for any angle of inclination to the axis, 6 of the prism group 4, 5 there is a strength for said prism which will result in nondeviation of axial pencils passing through the objective. If, however, we choose the angle of inclination to the axis of this prism 4, 5 in an arbitrary fashion, then the compression produced by the objective for pencils inclined to the axis will be appreciably greater for one, or the other of two pencils incident at equal angles to the axis but on opposite sides thereof. In the figure the pencils 9, 10 and 11, 12 making equal angles at the end 9, 11 of the objective will make unequal angles with the axis of the objective at the other end 10, 12.

In order to decrease the thickness of the prisms as much as possible they should be made of pairs of glasses having constringences which differ as much as possible. To a certain extent this implies differing indices as well. It is therefore advisable to combine the two glasses so as to give a minimum incidence angle at the cemented surface. They should have the arrangement shown in the figure in preference to being placed in the reverse order. The objectives being subject to heat when used in front of projectors, the two glasses of each prism should have nearly equal expansion coefficients in order to reduce strain and a tendency to separate at the cemented surface. These considerations together with the necessity of using clear white glass, limit the choice of glasses to rather few pairs. The same pair of glasses may be used for each prism.

For purposes of comparison, the strength of prisms having approximately equal indices of refraction may be given by their apex angles. Otherwise, the minimum deviation angle of the prism should be used to designate its strength.

Having determined upon an angle of inclination and strength for the prism pair 1, 2 one may achromatize the prism by trigonometric interpolation, for instance so that the $d$ and $g$ rays exit parallel to each other. One then chooses the angle of inclination to the axis, 6, of the second prism pair roughly five to ten percent greater than the angle of inclination to the axis, 3 of the first prism pair and one further chooses the strength of the second prism pair about ten percent less than that of the first prism pair. If the inclination angle, 3, is small, for instance 30°, then the second prism pair may properly be chosen relatively still weaker than the first prism pair, for instance thirty percent less strong and it may be positioned at a greater inclination. Having thus made an approximate choice the $d$ and $g$ rays, or any other suitable pair of rays, are then followed through the second prism, 4, 5 as continuations of axial rays which entered the first prism pair 1, 2. These two rays will not exit from the second prism pair either parallel to each other or to the axis of the objective but it is easily possible to make them do so by a multiple trigonometric interpolation changing the strengths of the prisms 4 and 5 and their angle of inclination, 6, to the axis of the objective. The result is an achromatized straight vision prism anamorphosing objective whose marginal distortions to the one side and the other are not widely different.

The distortion on each side of the axis of the objective is never entirely symmetrical but if it be made equal on the two sides for some appropriate angle, for instance 10°, it will then be sufficiently equal for all lesser angles. We therefore determine the lateral distortions at the two margins for such an angular opening and then if they are not equal we increase or decrease one or the other of the angles of inclination, 3 or 6, of the prisms 1, 2 or 4, 5 and the strength of the corresponding prisms until a balance of all the factors is obtained.

For certain magnifications, in other words, for a certain range of angular openings between the two prisms, when the distortion for moderately inclined rays (10°) is equal on both sides the angle of the front face of the second prism pair 4, 5, with the axis of the objective will be greater, but less than 10 percent greater than the angle of the front face of the first prism pair, 1, 2, with the axis of the objective. A relative increase in the latter angle decreases the distortion relatively of objects on the open side of the prisms. (Up) in the figure. There is another criterion which limits the construction of the objectives to forms having distortion differences not exceeding suitable amounts.

Namely for a straight vision anamorphosing prism objective the angle of incidence in air on the inner or front face of the second prism pair for a pencil 11, 12 making an angle in air outside of the objective at its compression end of 10° with its axis and lying to the open side of the objective from a parallel to the axis drawn through its incidence point on the outside surface of the second prism pair should be not more than 8° larger nor more than 2° less than the angle of incidence in air on the outer surface of the first prism pair for a pencil 9, 10 making an angle in air outside of the objective at its compression end of 10° with the axis and lying away from the open side of the objective from a parallel to the axis of the objective drawn through the incidence point of the pencil on the outer surface of the second prism. For brevity we will call these angles the exit angles of the second and first prisms respectively. For brevity, also, we will refer to the ray 11, 12 as more oblique and the ray 9, 10 as less oblique to the rear face of the objective at the compression end, since these rays are respectively more and less oblique to the prism face, although they are, in fact, equally inclined relative to the axial ray.

The optimum position and form for the prisms 1, 2 and 4, 5 having been determined and the whole having been chosen so as to produce a suitable compression this compression of the image may be increased by increasing the angle between the prisms, or vice versa. For any given rotation outward of the prism 4, 5 there is an angle of rotation outward of the prism 1, 2, an angle roughly 50% greater, which will maintain the null deviation of the axial ray. For any given prisms the exact ratio of the two angles, or better a suitable mean ratio, may be determined by trigonometric interpolation. The ratio is sufficiently constant over a moderate range to permit the construction of a straight vision prism anamorphoser having a variable compression or magnification constant. To obtain such a result the two prism elements may be mounted on axes parallel to each other and linked together by two toothed quadrants of unequal and appropriate radii. Such a construction is indicated schematically in the figure. At 13 and 14 are shown the ends of the axes of rotation and at 15 and 16 are indicated the quadrants. Their ratio is such that if for any objective the quadrant 16 has 50 teeth on a complete circumference then the quadrant 15 must have between 69 and 78 teeth for a complete circumference.

The angle of inclination of the front face of the weaker prism to the axis has been described above as approximately 10% greater than the angle of inclination of the front face of the stronger prism to the axis. This numerical relationship applies to the objective when the prisms of the illustrative example are in their mean position. When these prisms are rotated apart to increase the magnification, as discussed, this difference between the two angles will increase to and is about 16% for the most extended of the positions for which numerical data are tabulated in the illustrative example. A still further rotation, for instance by an additional like amount, brings the angular difference up to about 27%. Proportionate differences are also obtainable when increasing the strength and inclinations of the prisms in the manner herein suggested.

In the illustrative example there is given data for a particular position of inward rotation of the prisms. For a further inward rotation from the mean position of the table and illustration by a like amount, the angular difference becomes negative, that is the angle with the axis of the front face of the back or weaker prism is less than that of the front face of the front or stronger prism to the axis.

When in such a variable anamorphoser the prisms are rotated apart their angles of inclination to the axis of the objective decrease in unequal proportions and therefore the lateral distortions, if they started at a balance, become more and more unequal and greater in absolute magnitude. A point is soon reached where a practicable balance no longer exists. It is therefore advisable to choose the initial position at which the objective is balanced for distortion at such a place as to correspond to something above midway of the useful range of compression. The optimum position will be determined by the uses which the objective is to serve. An unbalance at the lower end of the scale, because of less absolute magnitude may appropriately be of greater relative amount than at the upper end of the scale. Slight inequalities are already shown at the two outside positions tabulated for the illustrative embodiment. As indicated below these may be corrected for at the one position or the other in the manner described for correcting at the mean position of the illustrative example. Greater angle of inclination differences than the arbitrary figures corresponding to the three positions of the illustrative embodiment for which data are tabulated are permissible while still retaining a balance of distortion to both sides of the axis. Without even increasing the strength of the prisms, for instance at a more extended position of the illustrative embodiment, angular differences up to 10° or more can readily occur. As indicated below there are reasons for not too greatly increasing the strengths of the prisms.

If the achromatism be balanced for the center of the scale, it will remain balanced for the useful range. For instance the $d$ and $g$ rays will remain parallel to within one or two thousandths of a degree.

In the figure I have drawn in longitudinal section a straight vision prism anamorphosing objective designed according to the above specifications and having at the position drawn an axial magnification constant of 1.455 and for which the marginal compression constants are about equal. If they had been made more nearly equal then they would also have been more nearly equal for positions corresponding to smaller magnification constants along the axis but the inequality for positions corresponding to greater axial magnification constants would have been increased. The axial magnification constant of the objective is to be increased or decreased by rotating the prisms apart or together from their initial position with respect to each other and the axis in the ratio of 5 to 7.2. The prisms of each pair are composed of glasses having as large a constringence difference as is compatible with the choice of practically identical expansion coefficients, namely 842 and 841. In the initial position as drawn the angle 3 is 46.°427 and the angle 6 is 50.°50. For the other two positions for which data is supplied below the latter angle is respectively 5° less and greater. Other data is as follows where the angles are expressed in degrees and decimals thereof:

|  | Angle | $n_d$ | $n_C$ | $n_x$ | $n_d - n_F$ |
|---|---|---|---|---|---|
| Prism 1 | 33°.823 | 1.54000 | 1.53720 | 1.55119 | .00632 |
| Prism 2 | 19°.45 | 1.6034 | 1.59874 | 1.62381 | .01120 |
| Prism 4 | 30°.90 | 1.54000 | 1.53720 | 1.55119 | .00632 |
| Prism 5 | 17°.994 | 1.60340 | 1.59874 | 1.62381 | .01120 |

|  | Contracted objective | Mean position objective | Extended objective |
|---|---|---|---|
| Axial magnification constant | 1.3108 | 1.4548 | 1.6893 |
| Lateral M.C. (10° up) | 1.3392 | 1.5212 | 1.8810 |
| Lateral M.C. (10° down) | 1.3506 | 1.5251 | 1.8453 |
| Lateral distortion up | 2.17% | 4.56% | 11.35% |
| Lateral distortion down | 3.04% | 4.83% | 9.23% |
| Exit angle prism 4 down | 54°.742 | 61°.750 | 70°.099 |
| Exit angle prism 1 up | 49°.660 | 58°.587 | 69°.096 |

The objective is calculated to have coincidence of the $d$ and $g$ rays to within a couple thousandths of a degree. In choosing these two rays I do not imply that they are the most appropriate pair that might have been chosen for any particular purpose. The method applies equally to any other pair. Likewise the prisms of the anamorphoser might have been chosen stronger or weaker and placed at greater or lesser angles with each other without altering the essential characteristics of the corrections involved. In the illustrative embodiment absolute equality of the distortion on the two sides at the mean position could have been obtained if it had been desired. It would have increased the inequality for that particular objective when extended. An alteration in construction to produce equal distortion for the mean position of this objective involves for instance a decrease of approximately 4/10 of a degree in the angle 3 and a decrease of approximately 7/100 of a degree in the total angle of the prism pair 1, 2. It is of course not necessary that such an objective should be so mounted as to have a variable magnification constant. The two prisms could be fixed in their mounting. Neither the size nor what is the same thing, the diameter, of the objective influence the calculations or the compression.

There are other considerations than reduction of unequal distortion involved in the design of anamorphosing prism objectives. In the first place these objectives have relatively high incidence angles for the light striking them and there is therefore an appreciable light loss. The light loss increases with decreased angles of inclination of the prisms to the axis of the objective and hence it increases with the compression produced. Likewise an asymmetrical distortion, if appreciable, is coupled with an increase in incidence angle on the side of the greater distortion and therefore with an increased loss of light on that side, an asymmetrical error which may be more obnoxious than the asymmetrical form of the picture. That this asymmetry may be by no means trivial is shown by the fact that the objective illustrated by Rudolph as cited above has a compression about thirty per cent greater on one side than the other of a ten degree half field.

For any given central compression the incidence angles may be decreased by increasing the strength of the prisms. There is a limit, however, to the extent to which this means may be used, if for no other reason than the resulting increase in thickness of the prisms and the length of the light path through them.

These objectives are to be used in front of ordinary photographic objectives or in front of projection lenses. The limit of the angular opening of the pencils used is determined by the marginal distortion which is permissible and by the marginal loss of light which is permissible. These errors increase rapidly with increasing incidence angles and therefore with increasing compression.

For objects at a less distance than infinity the oblique incidence of the pencils on the plane refracting surfaces produces astigmatism of the pencils. This astigmatism increases with the nearness of the object and with increasing angles of incidence. For near objects it appreciably affects the definition of the picture and thus limits the compression which may be used. It is a further cogent reason for equalizing the distortion at the borders of the picture. When working with objects placed in a certain distance range from the objective this astigmatism defect may be obviated by placing a simple lens of focal length equal to the object distance in front of the anamorphoser. This focal length being in general large compared with the opening it is sufficient to form this lens of two glasses cemented together of such nature as to make an achromatized objective having focal surfaces as nearly flat and coincident as possible and coupled with a minimum spherical aberration form.

It is practically prohibitive for reasons of size and loss of light to use a so-called fully corrected multiple element anastigmatic objective. There is, however, a very simple way in which to arrive at a suitably corrected lens. It is necessary to choose the cambrure of an achromatized lens such that there is a slight overcorrection for the astigmatism of marginal rays coming from points of the object in its focal plane. The analytical solution of this problem defines a cambrure which varies only very slightly for powers of the lens up to several diopters.

For practical purposes the solution defining the radius of curvature of the front surface of the lens may be taken as independent of the index of refraction and equal to 2.3 times the distance from the surface to the point at which the inclined refracted ray cuts the axis of the lens.

The trigonometric solution gives a larger factor than this, a factor which increases rapidly as the power of the lens approaches zero. For a lens of one quarter diopter, the strength which is probably here most interesting, the factor is about 50% greater. At one half diopter it is about 25% greater, and with increasing strength decreases to about 10% greater.

If in the figure the opening of the prism anamorphoser, the distance between the tails of the arrows, be taken as 18 mm. then the central rays of the inclined pencils passing the opening, when prolonged backward after exit from the anamorphoser at the free surface of prism 1 intersect in a point such that its distance from the front surface of a suitably placed correcting lens is 50 mm. Using the same glasses as for the prisms a correcting lens of ¼ diopter has the following characteristics:

$$r_1 = 172.5 \brace r_2 = 219.5 \quad n_1 = 1.5400 \quad d_1 = 4.0$$
$$r_3 = 219.5 \brace r_4 = 188.0 \quad n_2 = 1.6034 \quad d_2 = 2.5$$

Diameter 41 mm.

Owing to the residual unsymmetrical character of the light paths through the anamorphoser all of the pencils exiting from the anamorphoser at different angles of inclination with its axis do not come as if from a common point. A mean locus has to be taken therefore as defining the position of the correcting lens. If the correcting lens be too strong the residual decentration with respect to the ordinary photographic objective will be prohibitive.

If the anamorphoser is mounted to permit varying inclinations of its prisms, then this locus is displaced with such movement, both in the direction of the axis and in a direction perpendicular to the axis. A suitable mechanical arrangement must be provided to produce or permit a displacement of the correcting lens under such circumstances.

Certain subject matter disclosed in this application is disclosed and more fully explained and claimed in applicant's copending application for Letters Patent, Serial No. 611,964, filed May 18, 1932.

I claim:

1. An achromatic anamorphosing straight vision prism objective comprising two achromatized prisms of different strength having their bases oppositely arranged and their front faces oppositely inclined to the axis of the objective, the inclination of the front face of the weaker prism being greater but less than 16% greater than the inclination of the front face of the stronger prism substantially as described.

2. An achromatic anamorphosing straight vision prism objective comprising two achromatized prisms having their bases oppositely arranged, one prism having its front face inclined to the axis of the objective at a predetermined angle in one direction, the other prism having its front face inclined to the axis of the objective at an angle approximately 4 to 16% greater in the other direction, the strength of the latter prism being approximately 10% less than that of the first mentioned prism whereby the marginal distortion on opposite sides of the axis of the objective is substantially equal, substantially as described.

3. An anamorphosing prism objective comprising two prisms having their bases oppositely arranged, the prism at the expansion or front end of the objective having its front face inclined at a predetermined angle to a plane of the objective in which rays incident upon the objective exit from the objective without angular deviation, the base of the prism being forward of the apex of the prism, the other or back prism having its front face inclined to the aforesaid plane of the objective in the opposite direction and at an angle greater than but less than sixteen per cent greater than the first mentioned angle, the strength of the latter prism being less than the strength of the first mentioned prism.

4. An anamorphosing prism objective comprising two prisms having their bases oppositely arranged, the prism at the expansion or front end of the objective having its front face inclined to a certain plane of the objective at a predetermined angle in a direction such that the base of the prism is forward of the apex of the prism, the other or back prism having its front face inclined to the aforesaid plane of the objective in the opposite direction and at an angle greater than but less than sixteen degrees greater than the first mentioned angle, the strength of the latter prism being less than the strength of the first mentioned prism, the strengths of the prisms and their angular positions being so related to each other that a ray incident on the objective parallel to the aforesaid plane will exit from the objective parallel to the aforesaid plane and two rays incident on the objective at its rear or compression end inclined at equal angles but in opposite directions to the aforesaid plane of the objective will exit from the objective with substantially equal inclinations to the aforesaid plane of the objective.

5. An anamorphosing prism objective comprising two prisms having their bases oppositely arranged, the prism at the expansion or front end of the objective having its front face inclined to a certain plane of the objective at a predetermined angle in a direction such that the base of the prism is forward of the apex of the prism, the other or back prism having its front face inclined to the aforesaid plane of the objective in the opposite direction and at an angle greater than but less than thirty percent greater than the first mentioned angle, the strength of the latter prism being less than the strength of the first mentioned prism, the strengths of the prisms and their angular positions being so related to each other that a ray incident on the objective parallel to the aforesaid plane will exit from the objective parallel to the aforesaid plane and two rays incident on the objective at its rear or compression end inclined at equal angles but in opposite directions to the aforesaid plane of the objective will exit from the objective with substantially equal inclinations to the aforesaid plane of the objective.

6. An anamorphosing prism objective comprising two prisms having their bases oppositely arranged, the prism at the expansion or front end of the objective having its front face inclined at a predetermined angle to a plane of the objective in which rays incident on the objective exit from the objective without angular deviation, the base of the prism being forward of the apex of the prism, the other or back prism having its front face inclined to the aforesaid plane of the objective in the opposite direction and at an angle less than or less than 12° greater in the other direction, the strength of the latter prism being less than the strength of the first mentioned prism.

7. An anamorphosing prism objective comprising two prisms having their bases oppositely arranged, the prism at the expansion or front end of the objective having its front face inclined at a predetermined angle to a plane of the objective in which rays incident on the objective exit from the objective without angular deviation, the base of the prism being forward of the apex of the prism, the other or back prism having its front face inclined to the aforesaid plane of the objective in the opposite direction and at an angle less than or less than 9° greater in the other direction, the strength of the latter prism being less than the strength of the first mentioned prism.

8. An anamorphosing prism objective comprising two prisms having their bases oppositely arranged, and their front faces oppositely inclined to the axis of the objective, the prism at the expansion or front end of the objective having its base forward of its apex and its front face inclined at a predetermined angle to a plane of the objective in which rays incident on the objective exit from the objective without angular deviation, the other or back prism having its front face inclined to the aforesaid plane of the objective in the opposite direction and at an angle between 1° and 9° greater than the first mentioned angle.

9. An achromatic anamorphosing straight vision prism objective comprising two anchromatized prisms having their bases oppositely arranged, one prism having its front face inclined to the axis of the objective in one direction at a predetermined angle, the other prism having its front face inclined to the axis of the objective in the other direction at a greater angle, the latter prism being of less strength, the strengths of the prisms and their angular positions being so related to each other that a pencil of rays incident on the objective parallel to the axis will emerge parallel to the axis and pencils incident at angles of 10° to the axis in opposite directions will emerge with substantially equal inclinations to the axis, substantially as described.

10. An achromatic anamorphosing straight vision prism objective comprising two achromatized compound prisms of substantially the following dimensions, one prism consisting of a crown glass element having an angle of 33°.823 with an index of refraction for the $d$ line of 1.5400, and an oppositely arranged flint glass element having an angle of 19°.45 and an index of refraction for the $d$ line of 1.6034, the other prism consisting of a crown glass element having an angle of 30°.90 and an index of refraction for the $d$ line of 1.5400 and a flint glass element having an angle of 17°.994 and an index of refraction for the $d$ line of 1.6034, said prisms being oppositely arranged with the face of the second mentioned prism at an angle to the axis greater but not more than 16% greater than the face of the first mentioned prism, substantially as described.

11. An achromatic anamorphosing straight vision prism objective, as defined in claim 3, in which the crown and flint glasses of which each achromatized prism may be formed have substantially equal coefficients of expansion.

12. A variable strength achromatic anamorphosing straight vision prism objective comprising two achromatized prisms of different strength, the stronger prism having its front face inclined to the axis of the objective in one direction, the weaker having its front face inclined to the axis of the objective in the other direction at a greater angle, said prisms being geared together to rotate in opposite directions, the ratio of the gearing being such that the stronger prism will rotate through an angle approximately 50% greater than the weaker, substantially as described.

13. A variable strength achromatic anamorphosing straight vision prism objective comprising two achromatized prisms of different strength, the stronger prism having its front face inclined to the axis of the objective in one direction, the weaker having its front face inclined to the axis of the objective in the other direction at a greater angle, said prisms being geared together to rotate in opposite directions, the ratio of the gearing being such that the stronger prism will rotate through the greater angle in a ratio of between 50 to 69 and 50 to 78, substantially as described.

14. A variable strength achromatic anamorphosing straight vision prism objective, as defined in claim 12 in which the strengths and angles of the prisms are so selected that the distortion of pencils inclined moderately to the axis at equal angles in opposite directions is substantially equal for a position of the prisms corresponding to a little more than midway of the useful range of compression, substantially as described.

15. An anamorphosing straight vision prism objective, as defined in claim 3, comprising in addition thereto a correcting spherical lens placed in front of the front or first mentioned prism and having a focal length approximating the object distance, the radius of curvature of the front surface of the correcting spherical lens being less than half the object distance.

16. An achromatic anamorphosing straight vision prism objective, as defined in claim 4, comprising in addition thereto a correcting spherical lens placed in front of the front or first mentioned prism and having a focal length approximating the object distance, the radius of curvature of the front surface of the correcting spherical lens being substantially two to four times the distance from the correcting spherical lens to the ordinary photographic or projection objective with which the anamorphosing prism objective is used thereby giving the correcting spherical lens a cambrure such that the lens is approximately anastigmatic for marginal inclined rays, substantially as described.

17. An optical system comprising, in combination, a photographic lens or real image forming system, an anamorphosing prism objective as defined in claim 6 in front of the photographic lens, and in front of the anamorphosing objective a correcting lens with a focal length approximating the object distance having its free surfaces concave toward the anamorphoser.

18. An optical system comprising, in combination, a photographic lens or real image forming system, an anamorphosing prism objective as defined in claim 6 in front of the photographic lens, and in front of the anamorphosing objective an achromatized correcting lens having a focal length approximating the object distance with only two free surfaces both concave toward the anamorphoser.

HARRY SIDNEY NEWCOMER.